United States Patent [19]

Lawler

[11] Patent Number: 4,718,501
[45] Date of Patent: Jan. 12, 1988

[54] SELF-TRAILERING HOVERCRAFT

[76] Inventor: James R. Lawler, P.O. Box 36229, Houston, Tex. 77236

[21] Appl. No.: 773,372

[22] Filed: Sep. 5, 1985

[51] Int. Cl.$^4$ .......................... B60V 1/04; B60V 1/16
[52] U.S. Cl. ..................................... 180/117; 180/127
[58] Field of Search ............... 180/127, 128, 119, 116, 180/117; 114/344; 244/121

[56] References Cited

U.S. PATENT DOCUMENTS

| | | | |
|---|---|---|---|
| 2,280,583 | 4/1942 | Holloway et al. | 244/121 |
| 2,984,846 | 5/1961 | Maloney | 114/344 |
| 3,398,809 | 8/1968 | Wood et al. | 180/127 X |
| 3,481,424 | 12/1969 | Barr | 180/128 X |
| 3,561,558 | 2/1971 | Parkhous | 180/127 X |
| 3,583,520 | 6/1971 | Kirpitzinikoff | 180/116 X |
| 3,618,149 | 11/1971 | Christensen | 114/344 |
| 3,777,842 | 12/1973 | Laufman | 180/117 |
| 3,964,698 | 6/1976 | Earl | 180/128 X |
| 4,175,636 | 11/1979 | Broughton | 180/127 X |
| 4,413,697 | 11/1983 | Duneau | 180/127 X |

FOREIGN PATENT DOCUMENTS

| | | | |
|---|---|---|---|
| 0091113 | 10/1983 | European Pat. Off. | 180/117 |
| 1338472 | 11/1973 | United Kingdom | 180/117 |
| 1343600 | 1/1974 | United Kingdom | 180/116 |

Primary Examiner—John A. Pekar
Attorney, Agent, or Firm—David M. Ostfeld

[57] ABSTRACT

A self-trailering hovercraft is disclosed, having wheels such that the wheels can remain in the same position when the hovercraft is trailering or in the hover mode, or retracted for additional ground clearance while in hover mode if desired. A trailer hitch is provided that can be adjusted to various hitch heights for trailering or removed completely for operation in hover mode. Further, cockpit covering and unique U-shaped skirts having good closing and susceptable to easy repair are disclosed.

7 Claims, 11 Drawing Figures

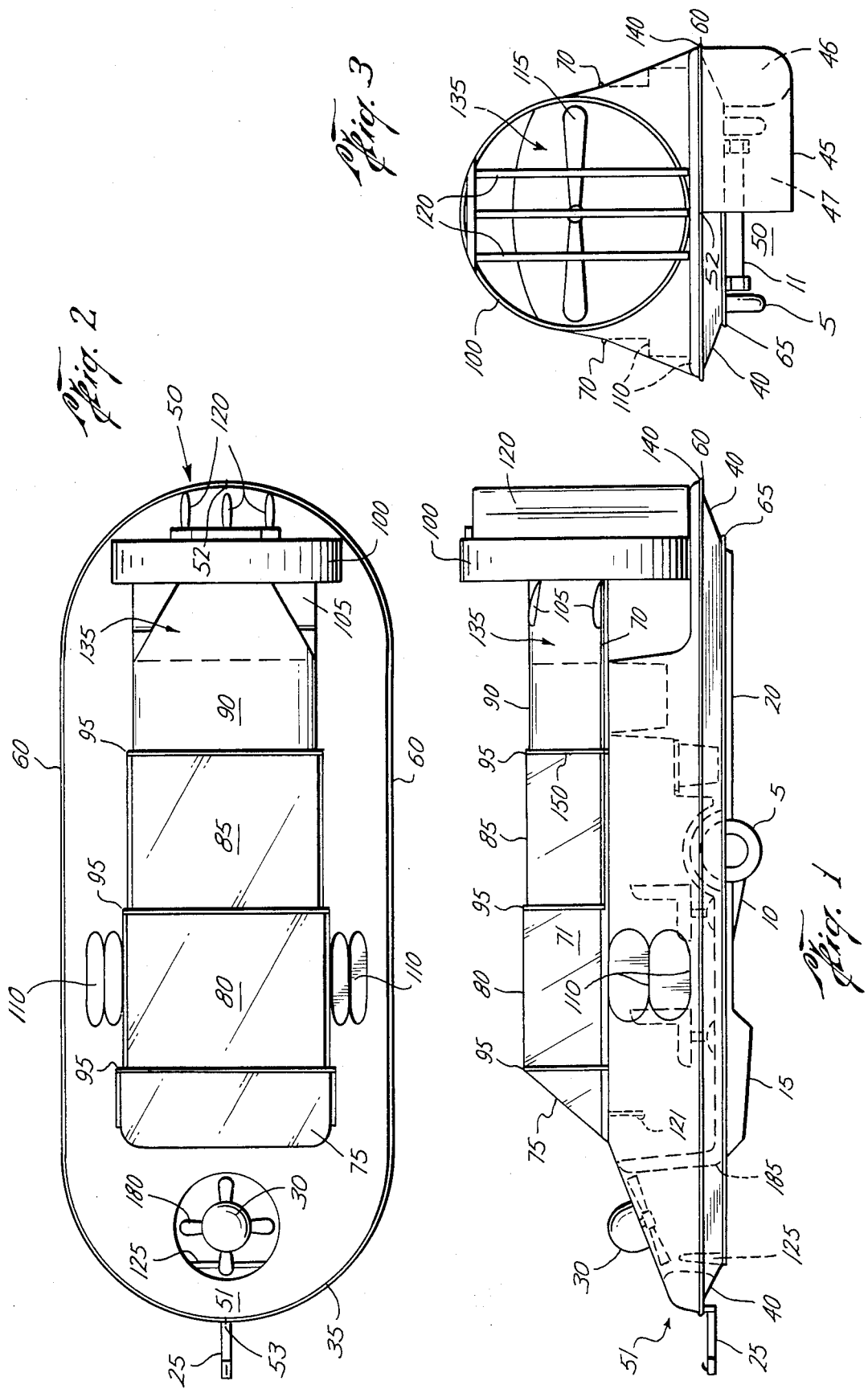

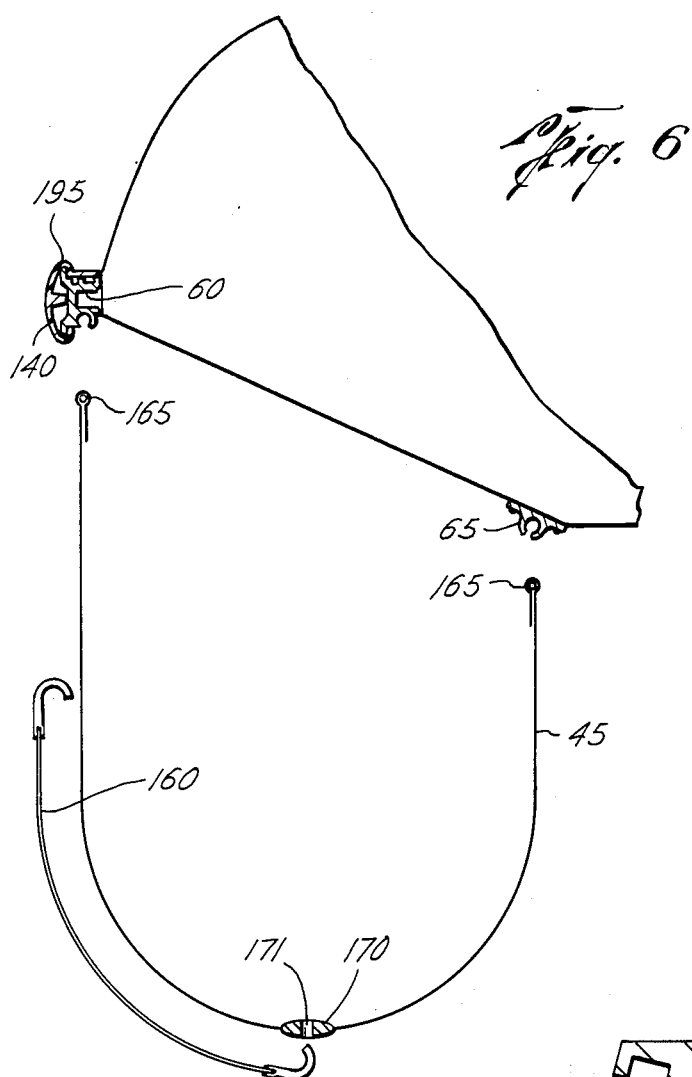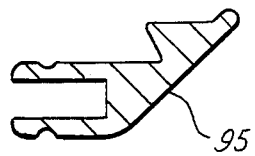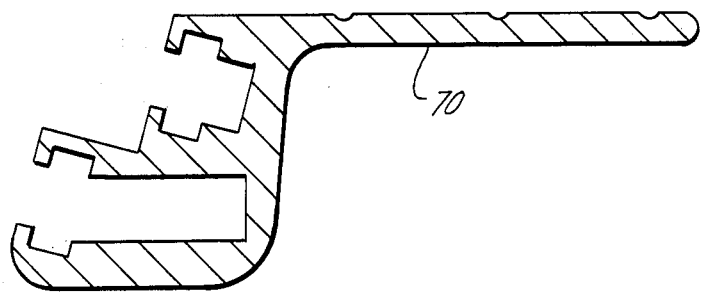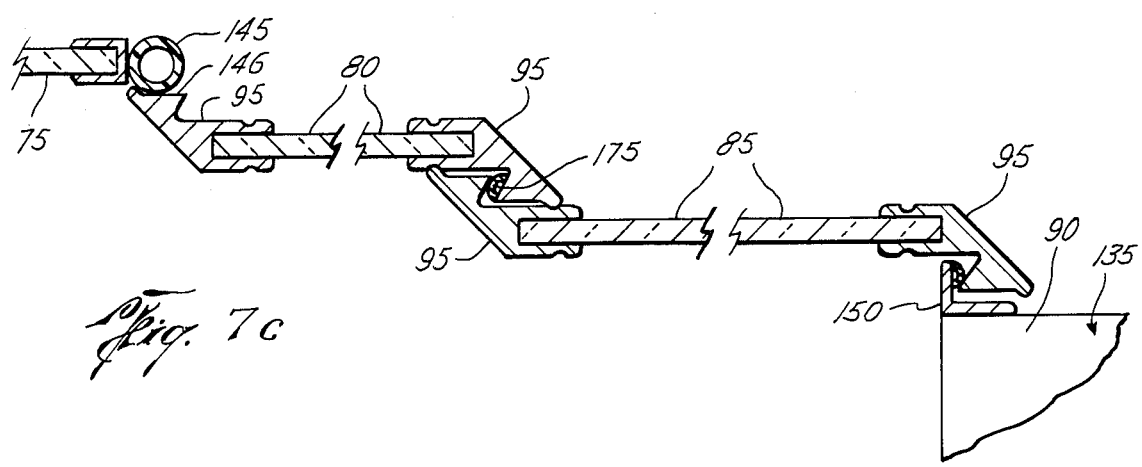

SELF-TRAILERING HOVERCRAFT

TECHNICAL FIELD

This invention relates to air cushion or ground effect vehicles, also known as air cushion vehicle, which can travel supported on a cushion of air maintained beneath the vehicle. More particularly, this invention relates to the field of vehicles propelled by pneumatic processes, an amphibious vehicle operating over land, water, ice or snow.

BACKGROUND ART

Much development work has already been done on vehicles propelled by pneumatic processes, but it has been directed to producing large and very costly craft for operation over water. Little effort seems to have been expended on the problems involved in designing comparatively small vehicles, and especially vehicles for the land or dual land/water role, at an economical cost. Skirt, cockpit and trailering designs are particularly important for small vehicles propelled by pneumatic processes.

In particular, see U.S. Pat. Nos. 3,078,939 to Bollum, Sr.; 3,117,643 to Cockerell; 3,866,707 to Paoli; 3,887,030 to Fitzgerald et al.; 3,891,047 to Rapson; 4,111,276 to Rapson et al.; 4,176,729 to Down; 4,215,757 to Henry et al.; and 4,258,817 to Hunt concerning skirt configurations of vehicles propelled by pneumatic process.

More particularly, Hunt discloses a vehicle propelled by pneumatic process wherein the skirt segments of the segmental skirt can be removed and replaced without getting under the vehicle hull. This arrangement is achieved by providing a tube 13 at each top end of the segment. The inner ends of the tubes are inserted into sockets 31 on the vehicle bottom surface. The outer edge of the skirt segment and the outer ends of the rods or tubes are held against the vehicle structure by a clamping member 22, as shown in FIGS. 1 and 6. Henry et al discloses an attachment device for releasably connecting a flexible skirt 11 to a rigid body structure of an air cushion vehicle having a plurality of first elements attached at spaced positions on the rigid body structure. A plurality of second elements, or independent flexible fingers 17, are attached to the first member, or the bag member 12, to depend downwardly therefrom and form a part of the lower skirt. The clamping arrangement is shown in FIGS. 2 and 3, wherein the inflatable member 12 is retained between clamping face 31 and clamping plate 29. Paoli discloses a skirt configuration for an air cushion vehicle, while Down discloses attachment means for attaching the fingers of a vehicle propelled by pneumatic processes skirt to its loop, as shown in FIGS. 5 and 6. Rapson et al U.S. Pat. No. 3,891,047 and Rapson et al U.S. Pat. No. 4,111,276 disclose additional details for controlling the operation of the vehicle propelled by pneumatic processes skirt. Fitzgerald et al and Cockerell are noted of general interest. Bollum, Sr. discloses a vehicle propelled by pneumatic processes with a depending skirt 81, as shown in FIG. 4. Additionally, Bollum discloses wheels 98 that allow the craft to be moved over land. The skirt is described in column 7, line 67 through column 8, line 22, while the operation of the wheels 98 is described in column 10, lines 13 through 33.

Also, see U.S. Pat. Nos. 3,174,573 to Chaplin; 3,295,864 to Norrby; 3,334,700 to Kennedy et al; 3,810,522 to Morgan et al; and 4,344,635 to Welton, with respect to trailering.

In particular, Norrby discloses a boat trailer having a trailer hitch and wheels 70 that may be rotatably positioned beneath the stern of the vessel to facilitate transport. Morgan et al. discloses a hovercraft wherein ground engaging wheels 13 are utilized by operating props 27 so that the vehicle propelled by pneumatic processes may be raised off the ground during transport. See FIG. 4. Chaplin discloses a vehicle propelled by pneumatic processes wherein wheels 70 are pivoted into and out of engagement with the road surface to enable the transport of the vehicle propelled by pneumatic processes over the ground—See FIGS. 10 and 11. Welton discloses a towbar 10 and wheels 16 for enabling a smal boat to be towed behind a trailer. Kennedy is cited for general interest.

However, in the prior art vehicle propelled by pneumatic processes designs:

(1). They usually have to be transported on land by large special flat bed trailers that were both unwieldly and costly. Loading on and off the trailer was both very time consuming and damaging to the vehicle propelled by pneumatic processes.

(2). Skirts were of the segmented type that required many different shapes for each craft. They leak air at each joint and are difficult to change when damaged. During cold weather operation on snow or water they accumulate so much ice in the finger skirt that they soon become overloaded due to weight of the accumulated ice that they failed to function.

(3). They have open cockpits. This presents serious difficulties during cold weather while operating over water as the craft kicks up a very fine mist of water that saturates anything it comes into contact with including all occupants of the cockpit.

It is an object of this invention to make the commercial utilization of vehicles propelled by pneumatic processes, and especially machines of smaller type, a more attractive and economical proposition.

DISCLOSURE OF INVENTION

The present invention provides a self-trailering, fixed wheel vehicle propelled by pneumatic processes for amphibious operation over land or water in all types of weather, and with occupants kept in relative comfort of an enclosed, cooled or heated cockpit as desired. It provides an overall design shape such that two identical U-shaped skirts can be easily installed or removed for replacement or repair. Because of the closed skirts design there is little or no ice build up in cold weather operation.

BRIEF DESCRIPTION OF THE DRAWINGS

For a further understanding of the nature and objects of the present invention, reference should be made to the following detailed description, taken in conjunction with the accompanying drawings in which like parts are given like reference numerals and wherein:

FIG. 1 is a side view, partly in phantom line, of the preferred embodiment of the present invention;

FIG. 2 is a top, plan view of the preferred embodiment of the present invention;

FIG. 3 is a rear view of the preferred embodiment of the present invention;

FIG. 6 is a detail, partly in cross section, of the outer rail and skirts attachment and also skirts stowing means and detail of inner rail and skirts attachment of the preferred embodiment of the present invention; and FIGS. 7(a)-(c) are details of the side views, partly in cross section, of the canopy rail, canopy frame and weather stripping.

PREFERRED MODE FOR CARRYING OUT THE INVENTION

Figure 4:
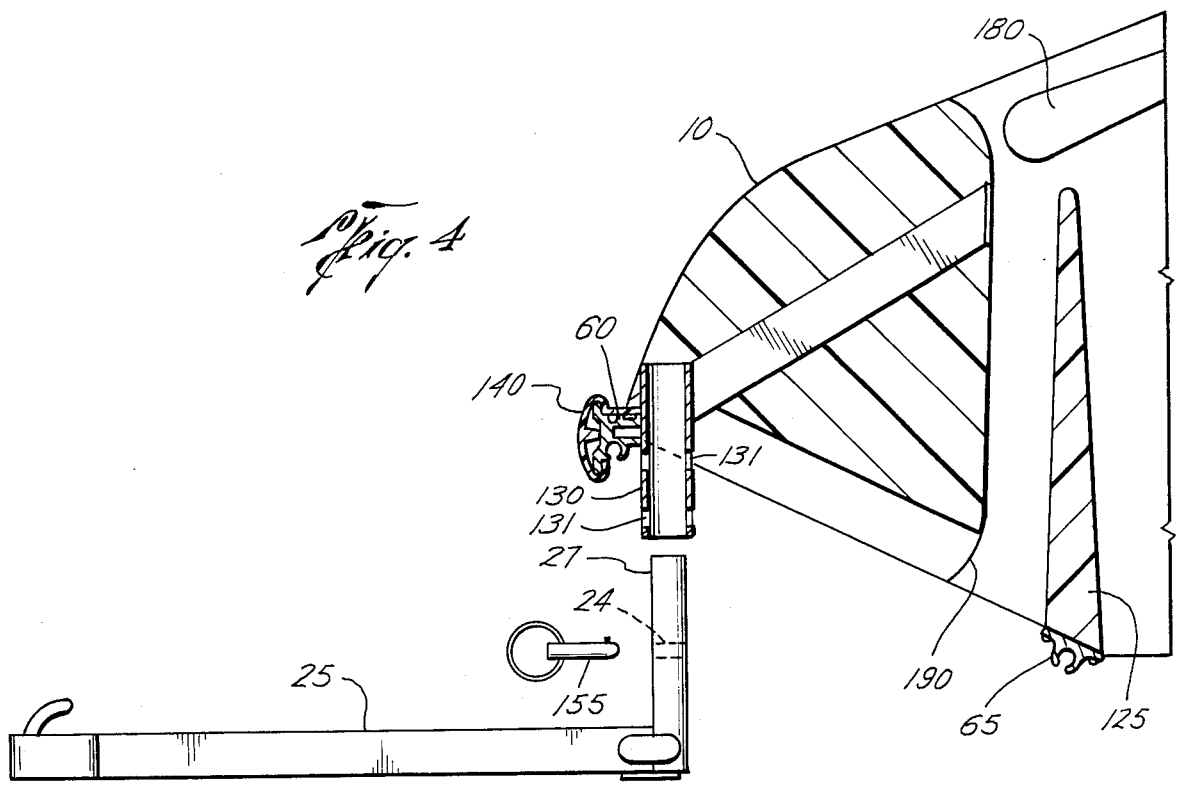
FIG. 4 is a detail side view, partly in cross section, of the trailer hitch and air splitter of the preferred embodiment of the present invention.

As shown in FIG. 1, wheels 5 support the vehicle propelled by pneumatic processes apparatus above the ground. Wheels 5 are fixed in place for trailering and remain in place during the hover mode of the vehicle propelled by pneumatic processes. Wheels 5 are sized to permit the skirts 45 (FIG. 3) to extend below them when skirts 45 are fully extended as air supports the vehicle propelled by pneumatic processes. Alternately, wheels 5 can be retracted upward for more ground clearance in hover mode, although this is not preferred.

Wheels 5 support composite hull 10. Composite hull 10 includes a portion 11 shaped to protect the wheels 5, axle (not shown) and springs (not shown) from damage while running in the hover mode. Hull 10 includes composite front skid 15 on the bottom portion of composite hull 10. Composite front skid 15 is shaped to land on the ground (not shown) for braking in the hover mode. Composite hull 10 further includes composite small skid 20 adjacent to composite front skid 15 and running the full length of the bottom of the hull 10. Small skid 20 is used for rigidizing and mounting of springs (not shown) for the wheel 5 assembly. Composite hull 10 further includes a front and rear composite portions of hull 10 of rounded shape.

As shown in FIG. 4, a removable trailer hitch 25 is mounted on composite hull 10 by bracket 130. Hollow bracket 130 is moulded into hull 10. Bracket 130 includes multiple holes 131 formed therein by drilling or other means, holes 131 having a sufficient diameter to receive spring loaded trailer hitch retaining pin 155 therein. Removable trailer hitch 25 further includes vertical member 27, having a hole 24 therethrough. Hole 24 is of the same diameter as holes 131. The outer diameter of member 27 is slightly smaller than, and the outer surface of member 27 has the same shape as, the inner diameter of the hollow portion of bracket 130, permitting member 127 to be telescoped into bracket 130 so that hole 24 comes into register with the appropriate one of holes 131. In this manner, removable trailer hitch 25 can be adjusted up or down by means of moving the spring pin 155 from one hole in hitch bracket 130 to another. It should be noted that the hitch bracket 130 is molded into the composite hull 10 and remains in place, whereas the rest of removable trailer hitch 25 may be removed when running in the hover mode, by releasing retaining pin 155, removing member 27 from telescopic engagement with hitch bracket 130.

As shown in FIGS. 1 and 2, lift engine 30 is mounted at the forward end of deck 35 is lift engine 30. It is mounted angled down forward to help provide forward thrust propulsion.

As shown in FIGS. 1 and 3, composite hull 10 further includes sloped hull sides 40, sloped up uniformly and completely around the perimeter of hull 10 for rough weather operation. Sloped hull side 40 has U-shaped skirts 45 (shown with the left skirt removed for clarity in FIG. 3) attached to it. The rounded shape of front and rear composite hull 10 and the deck portion 35 of hull 10 make it possible to use two identical U-shaped shirts 45 on both right and left sides of the vehicle propelled by pneumatic processes with only one joint in front and rear of the vehicle propelled by pneumatic processes.

As shown in FIG. 3, the U-shaped skirts 45 extend on each side of the sloped composite hull sides 40 from the center 52 of the rear 50 of the vehicle propelled by pneumatic processes to the center 53 of the front 51 of the vehicle propelled by pneumatic processes. The right and left skirts 45 are joined at the front center 53 and rear center 57 with velcrow, snaps or zipper (not shown) for easy installation and removal. Accordingly, the closed U-shaped skirts 45 do not accumulate snow and ice due to the closed design and also does not leak air as does the finger skirt designs of the prior art. Further it is easy to remove and repair if damaged by using rubber cement and a piece of the skirt, the skirt being comprised preferably of neoprene coated nylon. Because of the material and the shape, repair of the skirts 45 is similar to that of repairing an inner tube.

Figure 5A:
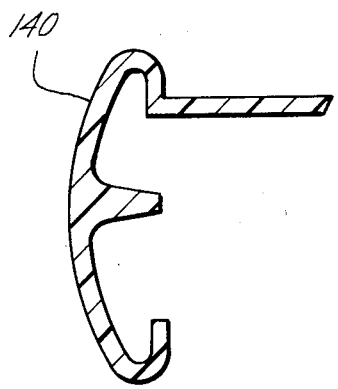
FIGS. 5(a)-(c) are detailed side views, partly in cross section, of the outer rail and inner rail cover of the preferred embodiment of the present invention.
Figure 5B:
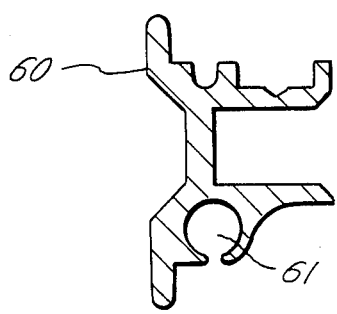

An outer rail 60 is mounted along, and to join, the composite deck 35 and hull 10. An outer rail cover 140, which also serves as a rub rail (FIG. 4 and FIG. 5(a)), is shaped to fit around outer rail 60 (FIG. 4 and FIG. 5(a) and FIG. 5(b)). Outer rail 60 is also provided with slot 61 to retain the outer edge of U-shaped skirts 45 which slide into it from front center 53 to rear center 52 of the vehicle propelled by pneumatic processes.

Figure 5C:
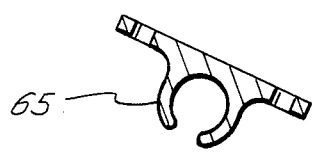

An inner rail 65 (FIG. 4 and FIG. 5(c)) is mounted on hull 10 at the lower edge of sloped hull 40. Inner rail 65 is shaped to receive the inside edge of U-shaped skirts 45, which slide into it from center 53 to rear center 52 of the vehicle propelled by pneumatic processes.

Referring to FIG. 6, U-shaped skirts 45 include rope 165 inlaid in the skirts 45, sized to fit within the receptacles of outer rail 60 and inner rail 65. U-shaped skirts 45 further include metal grommets 170 inserted in U-shaped skirts 45. Grommets 170 are provided to bleed-off high pressure air and to act as wear pads for drag along solid surfaces. Grommets 170 are also fitted with eyes 171. Bungee cords 160 are provided during transportation to fit into eyes 171 and over a post 195 provided in outer rail 60 to support U-shaped skirts 45 while trailering so that they do not drag.

As shown in FIGS. 1-3 and 7(a)-(c), a canopy rail 70 is mounted at the top of deck 35. Canopy rail 70 runs from windshield 75 mounted in the front 51 to the rear thrust propeller shroud 100 in the rear 50 on both sides of cockpit 71. Canopy rail 70 is mounted to support a rear storage compartment 90, which is part of a thrust engine compartment 135.

Front sliding canopy slides 80 and rear sliding canopy slides 85 are slidingly mounted on canopy rail 70 along both sides of deck 35. Front sliding canopy slides 80 are sized to have an inner surface slightly larger than rear sliding canopy slides 85 so that they are telescopingly received over rear sliding canopy slides 85. Behind rear sliding canopy slides 85, there is mounted the rear storage compartment 90, molded into the front part of the thrust engine compartment 135. The outer dimensions of rear storage compartment 90 are sized to permit telescoping of rear sliding canopy slides 85 over rear storage compartment 90, which is the same dimension as the thrust engine compartment 135. Accordingly, both front sliding canopy slides 80 and rear sliding canopy slides 85 telescope completely over thrust engine compartment 135, including storage compartment 90. Canopy slides 80, 85 form the entire canopy for cockpit 71. Canopy slides 80, 85 slide telescopically over canopy frame 95, which has weather stripping 175 provided thereon (FIG. 7(c)).

As shown in FIG. 7(c), windshield 75 is provided at the front of cockpit 71, made of shaped plastic that overlaps front canopy 80 and has a weatherseal 145 installed for weatherproofing joint 146, when the front canopy 80 is closed. For this purpose, weather stripping 145 is provided for the windshield 75. In addition, weather stripping 150 is provided for rear storage and thrust engine compartment 90, 135. Weather stripping 175 is also provided between front and rear canopy frames 95.

Steps 110, molded into composite deck 35, are provided to provide access to cockpit 71.

Thrust engine compartment 135 is molded into the rear of the deck 35 and is supported and fastened to canopy rails 80, 85. Mounted adjacent to and to the rear of thrust engine compartment 135 is thrust propeller shroud 100. Located interiorally of thrust propeller shroud 100 is thrust engine propeller 115, protected by shroud 100. Thrust propeller shroud 100, besides being a guard, provides higher efficiency operation for propeller 115. Thrust engine propeller 115 is connected to an engine (not shown) and provides the primary thrust for the vehicle propelled by pneumatic processes. Mounted on either side of thrust engine compartment 135 are combination straightening veins and lift air foils 105. Air foils 105 are provided for more efficient operation. Rudders 120 are provided rotatingly mounted onto shroud 100. Rudders 120 provide directional control and are connected (not shown) to steering wheel 121 in the cockpit 71.

At the front 51 of the deck 35, there is provided a lift engine fan 180 connected to and located in the same space as lift engine 30. Lift engine fan 180 is provided for forcing high pressure air into U-shaped skirts 45 and the inner high pressure air lift area formed by skirts 45. An air splitter 125 is mounted below lift engine fan 180 for proportioning high pressure air from the lift fan 180 in the interior 46 of U-shaped skirts 45 and the inner high pressure support area 47 formed by U-shaped skirts 45. To facilitate air splitter 125, a tunnel 185 is provided for channeling the high pressure air from lift fan 80 into the interior 46 of U-shaped skirts 45 and the inner high pressure lift area 47 formed by U-shaped skirts 45.

Because many varient or different embodiments may be made within the scope of the inventive concept herein and taught including equivalent structures or materials hereinafter thought of, and because many modifications may be made in the embodiments herein detailed in accordance with the descriptive requirements of the law, it is to be understood that the details herein are to be interpreted as illustrative and not in a limiting sense.

What is claimed as invention is:

1. A vehicle propelled by pneumatic processes, comprising:
   a hull having sides and a bow and a stern;
   wheels mounted on said hull;
   a skirt attached to said sides of said hull at two positions to form a U-shaped skirt forming a first chamber in the interior of said U-shape and a second chamber interior of the inner wall of said U-shaped skirt;
   a deck mounted on said hull forming an upper, substantially lateral surface on said bow and sides;
   a cockpit formed in said deck;
   a rear thrust engine mounted on said hull at the rear of said cockpit; and
   a rear thrust propeller mounted on and driven by said rear engine wherein
   said sides are sloped;
   said skirt is formed of two mirror image pieces; and
   said hull is round in shape at the bow and stern, identical profile on each side, and one each of said pieces of said U-shaped skirt extending from substantially the middle of said bow to the middle of said stern along one of said sides.

2. The vehicle propelled by pneumatic processes of claim 1, wherein said two pieces of said U-shaped skirt are joined together only at said bow intersection and said stern intersection.

3. The vehicle propelled by pneumatic processes of claim 1, wherein said U-shaped skirt is made of neoprene coated nylon.

4. A vehicle propelled by pneumatic processes, comprising:
   a hull having sides and a bow and a stern;
   wheels mounted on said hull;
   a skirt attached to said sides of said hull at two positions to form a U-shaped skirt forming a first chamber in the interior of said U-shape and a second chamber interior of the inner wall of said U-shaped skirt;
   a deck mounted on said hull forming an upper, substantially lateral surface on said bow and sides;
   a cockpit formed in said deck;
   a rear thrust engine mounted on said hull at the rear of said cockpit; and
   a rear thrust propeller mounted on and driven by said rear engine wherein
   said sides of said hull at the junction with said deck are covered with an outer rail;
   said outer rail is covered with a rub rail;
   said sides are sloped and the bottom of the slope is covered by an inner rail having a slot therein; and
   said outer rail includes a slot, each of the sides of said U-shaped skirt includes a fixed fold and a rope inserted in said fixed fold, said ropes sized to be inserted with said folds into said slots.

5. The vehicle propelled by pneumatic processes of claim 4, wherein there are further included in said U-shaped skirts metal grommets having means for pressure relief of said first chamber.

6. The vehicle propelled by pneumatic processes of claim 5, wherein there are further included suspension means for suspending said U-shaped skirts above the ground, said suspension means being attached to said grommets and said outer rail.

7. The vehicle propelled by pneumatic processes of claim 6, wherein said suspension means includes bunge cords.

* * * * *